March 27, 1951 F. C. MOCK 2,546,901
CARBURETION SYSTEM
Filed April 30, 1947 5 Sheets-Sheet 3

FIG. 3

INVENTOR.
FRANK C. MOCK
BY
ATTORNEY

March 27, 1951 F. C. MOCK 2,546,901
CARBURETION SYSTEM

Filed April 30, 1947 5 Sheets-Sheet 4

INVENTOR.
FRANK C. MOCK
BY
ATTORNEY

March 27, 1951  F. C. MOCK  2,546,901
CARBURETION SYSTEM

Filed April 30, 1947  5 Sheets-Sheet 5

INVENTOR.
FRANK C. MOCK
BY
ATTORNEY

UNITED STATES PATENT OFFICE 2,546,901

CARBURETION SYSTEM

Frank C. Mock, South Bend, Ind., assignor to Bendix Aviation Corporation, South Bend, Ind., a corporation of Delaware Application April 30, 1947, Serial No. 745,003

12 Claims. (Cl. 123—25)

This invention relates to carburetors or fuel metering pumps of the type disclosed in my prior copending applications Serial Nos. 362,085, filed October 31, 1940 and now Patent No. 2,426,153 and 586,223 filed April 2, 1945, now Patent No. 2,531,780 and the present application constitutes a continuation-in-part of my copending application Serial No. 588,023 filed April 12, 1945 and now Patent No. 2,509,648. In fuel metering devices of this type the fuel supplied to an engine or power plant is measured or metered on the basis of engine speed modified by one or more operating functions indicative of mass air flow to the engine, or air consumption, as distinguished from the conventional injection carburetor wherein the fuel is metered primarily as a function of mass air flow. Such a device may utilize a pressure type fuel pump and a fuel inlet valve controlled by a speed responsive element such as a centrifugal governor rotating in synchronism with the engine and whose thrust is opposed by a metering head diaphragm. Since the governor thrust is proportional to R. P. M. squared, the metering head is also proportional to R. P. M. squared; and assuming a fixed metering jet, fuel flow therethrough will be proportional to engine speed for a given engine condition. If now the area of the jet is controlled by a needle movable in relation to some operating characteristic indicative of the weight of air consumed per engine revolution, a relatively accurate or predetermined fuel-air ratio may be expected throughout the power range.

In carburetors of the speed type, as in conventional injection carburetors, it is desirable to have means whereby a pilot or engine operator may select different fuel-air ratios or metering curves; for example, a lean ratio or curve for favorable operating conditions which will provide maximum economy values of fuel flow, as for cruising at moderate speeds and/or light loads, and a richer fuel-air ratio or curve which may be selected for metering in the higher power ranges and/or under unfavorable engine operating conditions, as where ignition or other trouble develops and which without fuel enrichment would result in engine failure. In my Patent No. 2,531,780 there is disclosed a means for obtaining different fuel-air ratios by selectively varying the head across the metering orifice at any given engine speed, but this method may not be found suitable for certain installations, particularly where an antidetonant is to be metered to the engine at emergency power settings. The instant invention provides for selective fuel-air ratios at any given engine speed by varying the area of the metering orifice or orifices with a single metering needle and a coacting manually operable valve member which may conveniently be used for derichment of the normal fuel charge for water injection.

An object of the invention, therefore, is to provide in a speed carburetor or metering pump improved means for selectively metering fuel at different fuel-air ratios.

Another object is to provide in a carburetor of the type specified means whereby selected fuel-air ratios may be had with a single main metering needle.

A further object is to provide in conjunction with such a carburetor improved means for metering an auxiliary fuel such as an antidetonant to the engine, and a control for selectively metering along a plurality of air-fuel ratio curves and for automatically deriching the carburetor when water is to be injected.

The foregoing and other objects and advantages will become apparent in view of the following description taken in conjunction with the drawings, wherein.

Referring to the drawings and first to Figures 1, 2, 4 and 5, the speed metering pump or carburetor comprises a main housing 10 having a portion shaped to define a fuel intake chamber 11 to which fuel may be supplied from a tank or other suitable source, not shown, through a conduit 12. A fuel pump is generally indicated at 13; it is of the vane type and includes a rotor 14 formed with a series of radial slots, mounting vanes or blades 14' and a center bore in which is received a hollow eccentric camming sleeve or cylinder 15. The rotor assembly is rotated by a shaft 16 having a reduced center portion 16' projecting through the cylinder 15, and the rotor itself is rotatably supported by a sleeve-like cage 17 formed with intake and discharge openings 18 and 19 at an intermediate point and terminating at its opposite ends in annular portions or rings 17' which cam the rotor vanes or blades radially inwardly against the sleeve or cylinder 15. The rotor shaft 16 has a gear 20 secured on the outer end thereof adapted to be driven by the engine or power plant to be supplied with fuel.

Figure 2:
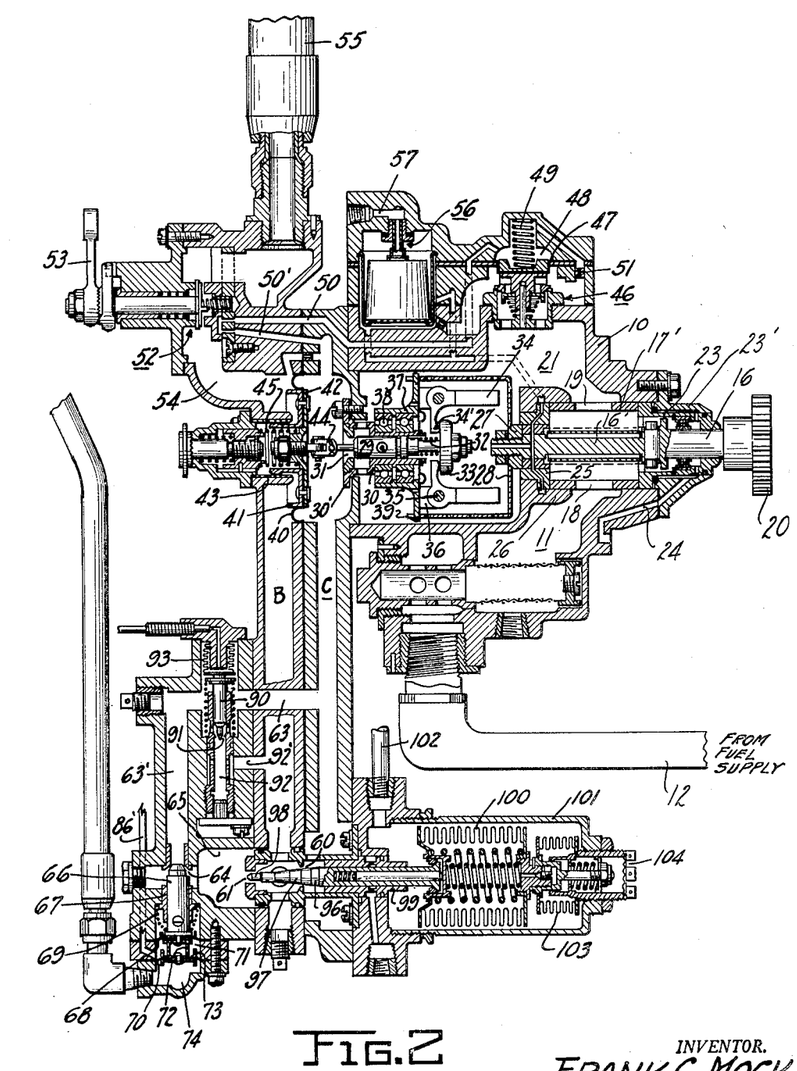
Figure 2 is an enlarged sectional view of the lower portion of Figure 1, showing the carburetor per se.

The pump takes fuel from the chamber 11 and forces it under pressure into a governor chamber 21 defined in part by a wall member 22 having a transverse portion 22' shown as formed integral with the housing 10, said wall member and housing having opposed thickened portions contoured to receive the rotor cage 17. Inner and outer end caps 23 and 23', the latter being removably secured to the housing 10, support the sealing and bearing assemblies for the outer end of shaft 16, to which oil may be supplied by way of a duct 24 forming part of the engine force feed oiling system.

The left end of the rotor 14 is journaled in a bushing 25, the latter being mounted in a boss 26 formed integral with the housing or casting 10.

The inner end (left-hand end in Figure 2) of the rotor shaft 16 has keyed or otherwise secured thereon a bushing 27, which forms the hub of a cup 28 having a driving connection with a governor and poppet valve assembly comprising a poppet valve 29 mounted to slide in a bushing 30 supported by a ring or flange 30' secured to the adjacent wall of an unmetered fuel chamber C, said bushing being formed with a valve seat defining a valve port 31. The inner or right-hand end of the poppet valve 29 is reduced and encircled by a spring 32 which at its left end abuts a shoulder formed on the valve body and at its opposite end bears against the inner race of a thrust bearing 33.

The governor weights are indicated at 34; they are journaled on pins 35 and have formed integrally therewith fingers 34' adapted to engage the outer race of the thrust bearing 33 and urge the poppet valve 29 towards open position with a force depending on the speed of rotation and the resultant centrifugal effect of the weights 34. The pins 35 are anchored in yokes 36 forming part of a hub member 37 carrying the outer race of a bearing assembly 38, the inner race of the latter being secured on the bushing 30. A driving connection between the rotary shaft 16 and the governor is provided by means of lugs 39 projecting radially from the flange of the hub 37 and engaged in open slots formed in the adjacent edge of the cup 28, the latter serving to reduce turbulence of the fuel in the governor chamber and to also limit the throw of the governor weights under certain conditions, as when there is no appreciable differential pressure across the metering head diaphragm indicated at 40.

The diaphragm 40 is clamped between the radial portions or flanges of a pair of bushings 41 and 42. The bushing 41 is slidably mounted in a guide sleeve 43, while the bushing 42 is connected to the adjacent stem of the poppet valve by means of a universal coupling 44. An idle spring 45 engages the diaphragm bushing 42 and applies a predetermined force in an opening direction on the poppet valve 29 at low idling speeds, to insure sufficient metering head pressure for idling purposes.

The pump intake or low pressure chamber 11 is separated from the governor or pump delivery chamber 21 above the latter by the transverse portion 22' of the wall member 22, and the said transverse portion mounts a two-way by-pass valve generally indicated at 46 carried by a diaphragm 47 of substantially the same mean effective area as the seat of the said valve, the said diaphragm forming a movable or flexible wall of a balancing chamber 48. A spring 49 urges the valve 46 to its seat and allows it to open when the pressure in chamber 21 exceeds the pressure in chamber 48 by some predetermined amount, depending upon the strength of the said spring.

In order to prvide a substantially constant pressure drop across the poppet valve 29 and balance the various pressures in the metering system, the chamber 48 is connected by a duct or passage 50, 50' with unmetered fuel chamber C. Chamber 48 also communicates with the chamber 11 through a restricted orifice or bleed 51 to permit complete filling of the chamber 48.

When the pump is initially placed in operation and sufficient pressure is built up in the governor chamber 21, the two-way valve 46 will open. When this valve opens, fuel pressure will be built up in the chamber 11 to a predetermined value, whereupon fuel will pass through the orifice or bleed 51 into chamber 48. Since this latter chamber is in communication with the unmetered fuel chamber C, the pressure on the upper side of the diaphragm 47 will be unmetered fuel pressure while that on the lower side of the valve 46 will be equivalent to that in the governor chamber 21; and the differential between these chambers 48 and 21 and hence the drop across the valve 29 will be maintained at a substantially constant predetermined value as determined by the spring 49 irrespective of the flow of fuel delivered by the unit.

The valve generally indicated at 52 is an idle cut-off valve; it is used to completely cut off fuel to the engine to stop the latter and is provided with a stem to which an operating lever 53 is secured. This cut-off valve carries a cylindrical rotary valve member located in the fuel discharge conduit 54 and having a through passageway or valve port adapted to register with said conduit when the valve handle is turned to "on" position. In the position shown, the valve is open and fuel may flow through the conduit 54. The fuel discharge conduit 54 is adapted for attachment of a suitable fuel line 55 leading to a pressure spray nozzle to be described. The passage or duct 50 connects with the continuation 50' thereof through a valve port controlled by the valve 52, so that when the idle cut-off valve is closed, communication between the passages 50 and 50' is likewise closed, thereby cutting off communication between the unmetered fuel chamber C and the chamber 48. The reason for this is that should the unmetered fuel pressure still be applied to chamber 48 after fuel flow is stopped and during further running of the engine due to a momentum, the by-pass valve 46 would not open and dangerously high pressure would be built up in the system.

The float valve generally indicated at 56 controls a vapor vent line 57 leading back to the fuel tank and forms part of a vapor elimination system which acts to centrifuge air and vapor from the fuel before any of the fuel in the governor chamber 21 is passed through the relief valve back to the low pressure side of the engine driven pump. For an understanding of this system, reference is had to the copending application of Willard F. Blakeway and Albert P. Schnaible, Serial No. 586,224 filed April 2, 1945, now Patent No. 2,539,484.

The foregoing description of the metering pump and governor and poppet valve assembly has been abbreviated, since the specific construction of these parts forms no essential feature of the present invention only insofar as it brings into the combination an operative device for producing a metering head proportional to the square of engine speed, or as a function of engine speed. For a more complete disclosure and description of these parts, reference may be had to the copending application of J. A. Bolt and Frederick P. Jackson, Serial No. 660,248 filed April 6, 1946, now Patent No. 2,531,664.

A feature of the present invention is the means whereby a pilot may select a predetermined fuel-air ratio for a given operating condition, which means will now be described.

The main metering orifice is indicated at 60; it constitutes a variable restriction between unmetered fuel chamber C and metered fuel chamber B, the latter being in communication with the conduit 54 and the fuel line 55. A supplemental or enrichment metering orifice is indicated at 61; it is in alignment with the orifice 60 and constitutes a like restriction for regulating the flow of fuel from chamber C by way of passages 63, 63' and valve port 64 to chamber 65 and thence through the said orifice 61 to chamber B. Valve port 64 is controlled by a selectively operable valve 66 which is slidable in a bushing 67 and at its lower end is connected to a diaphragm 68. A spring 69 normally urges the valve 66 toward open position. Another diaphragm 70 is arranged in spaced relation with respect to the diaphragm 68 and in conjunction with the latter defines a chamber 71. A one-way abutting connection is provided between the lower diaphragm 70 and the upper diaphragm 68 by a member 72 which is secured to the bottom or adjacent end of the valve 66 and constitutes a reinforcement for the upper diaphragm. When the lower diaphragm moves upwardly, the central reinforcing plate 73 thereof engages the member 72.

Beneath the lower diaphragm is a pressure chamber 74 to which an operating pressure may be applied to close the valve 66, such operating pressure in the present instance being applied automatically when an antidetonant is to be metered to the engine in a manner to be described.

Fluid pressure may be selectively applied to the chamber 71 between the upper and lower diaphragms by means of a mixture selector unit or valve assembly generally indicated at 75 (note particularly Figure 5) and including a two-way solenoid valve 76, which is connected to an armature 77 for electrical actuation in one direction (upwardly in Figure 5) and is urged in the opposite direction by a spring 78. A solenoid coil 79 is mounted in a housing 80 and is provided with a terminal 81 located in a connector for a plug 82, a circuit wire 82' connecting the terminal 81 with the one contact 229 of a manifold pressure switch 230 to be described, the opposite contact 229' of the switch 230 connecting by wire 82'' with a contact 83' adapted to be selectively engaged by a manually operable switch 83 located in the pilot's compartment or within easy access of an operator and connected in circuit with a battery 84' by wire 84.

Figures 5, 8:
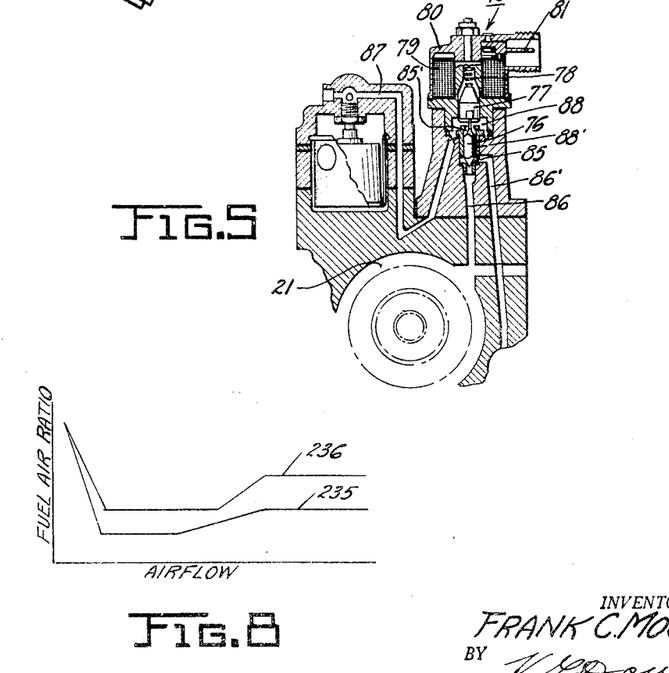
Figure 8 is a curve chart illustrating the fuel metering characteristics of the carburetor.

The valve 76 controls ports 85 and 85'. The port 85 intercommunicates passages 86 and 86', the passage 86 receiving fuel under pressure and communicating same by way of port 85 and passage or conduit 86' to the chamber 71. The port 85' intercommunicates vent passage 87 with the passage 86' by way of chamber 88 and passage 88' extending through the valve housing.

Figure 6:
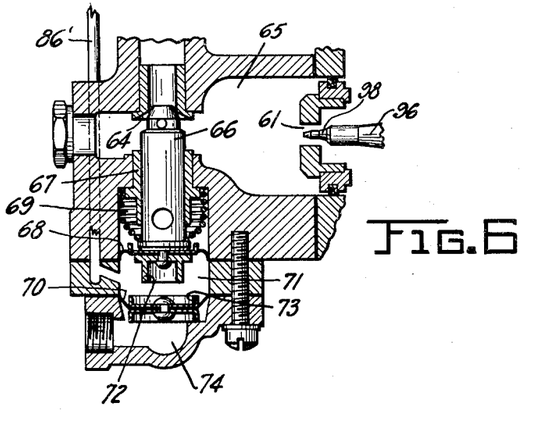
Figure 6 is a fragmentary view of the derichment valve and coacting parts in the position they occupy when the water regulator is idle and the mixture selector is turned to a "lean" fuel-air ratio.
Figure 7:
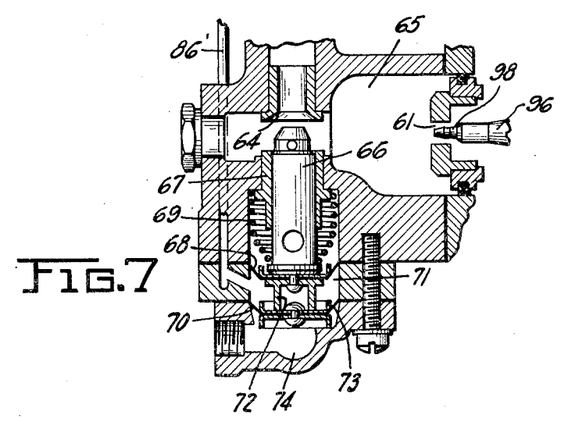
Figure 7 is a view similar to Figure 6 with the parts in the position they occupy when the water regulator is idle, but with the mixture selector turned to a "rich" fuel-air ratio.

When the solenoid coil 79 is energized, the armature 77 is drawn upwardly, moving valve 76 clear of port 85 and closing port 85', whereupon fuel under pressure is communicated to chamber 71 from the governor chamber 21 through passages 86, 86', note the position of the valve 66 in Figure 6, the vent passage 87 being closed; and when said coil is de-energized, the spring 78 moves valve 76 clear of port 85' and closes port 85, whereupon pressure is relieved from chamber 71 by way of passages 86', 88', chamber 88 and passage 87, and the valve 66 opens as shown in Figure 7. The vent passage 87 communicates with the vapor vent line 57 which may lead to the fuel tank, as heretofore noted.

The valve 66 may also be closed (the position in Figure 2) by a build-up of pressure in chamber 74, since should the valve be open when pressure is communicated to said chamber, the lower and upper diaphragms 70 and 68 will act in unison on said valve.

The fuel-air ratio may also be varied as a function of engine temperature by suitable means such as the valve 90 (Figure 2) which is arranged to control a port 91 between the passage 63 and a passage 92, the latter communicating with a passage 92' leading to the metered fuel chamber B. The valve 90 is controlled by a temperature compensating bellows 93 which is in fluid pressure communication with a temperature responsive element 94 (Figure 1) by means of a tube or conduit 95, the latter being adapted to be mounted in the engine induction manifold. The temperature compensating bellows 93 is thus rendered responsive to variations in engine manifold temperature and will adjust the valve 90 so as to in turn adjust the fuel-air ratio by metering a predetermined quantity of fuel from chamber C through port 91 to the chamber B. This temperature compensating arrangement forms no part of the present invention; it is more fully described in Patent No. 2,531,780, heretofore noted.

The main metering orifice 60 and supplemental enrichment of auto-rich metering orifice 61 are controlled by a single metering needle 96 which is provided with a pair of contoured metering sections 97 and 98. The position of the needle 96 is varied in relation to changes in manifold pressure modified by exhaust back pressure and accordingly it is slidable in a bushing 99 and is connected to the movable end of a bellows 100 mounted in a housing 101 to which manifold pressure is communicated by way of conduit 102. The bellows 101 is in turn connected to the movable end of a smaller bellows 103 which is anchored to the adjacent end of the housing 101 and has its interior vented at 104 to the atmosphere. For an understanding of the construction and operation of the bellows assembly 100, 103, reference may be had to my Patent No. 2,531,780. Briefly however, in operation, the bellows 100 responds to changes in manifold pressure while the bellows 103, being vented to atmosphere responds to changes in atmospheric pressure which is an index of exhaust back pressure. As manifold pressure increases, the bellows or capsule 100 is compressed, thereby retracting needle 60 from the metering orifices 60, 61 and as manifold pressure decreases, the bellows 100 expands and projects the needle 60 into said orifices, this action being modified by travel of the bellows 103 in relation to changes in atmospheric pressure, while the temperature responsive needle 90 controls metering of fuel across the by-pass 63, 92'.

The metered fuel in chamber B flows by way of fuel line 55 and strainer 105 into a chamber 106 (note Figure 3) and thence into discharge nozzle chamber 107, from which it is discharged through a nozzle opening 108 into intake conduit 109 posterior to throttles 110, 110'. The discharge opening 108 is controlled by a discharge nozzle 111, which may be of any preferred pressure type; as shown in the present instance, it is slidable in a bushing 112 and has its stem connected to a diaphragm 113 backed up by a spring 114 mounted in a housing or cover 115, the interior of the latter being vented to the air intake conduit upstream of the throttles 110 by means of passages 116 and 117. When the fuel pressure in chamber 106 attains a predetermined value, for example, ten p. s. i., the nozzle is retracted from the opening 108 and fuel is discharged into the air intake conduit 109. The chamber 106 contains metered fuel only during normal periods of operation, or without water injection, but when water is being injected, this chamber together with the nozzle chamber 107 also serves as a mixing chamber.

Figure 1:
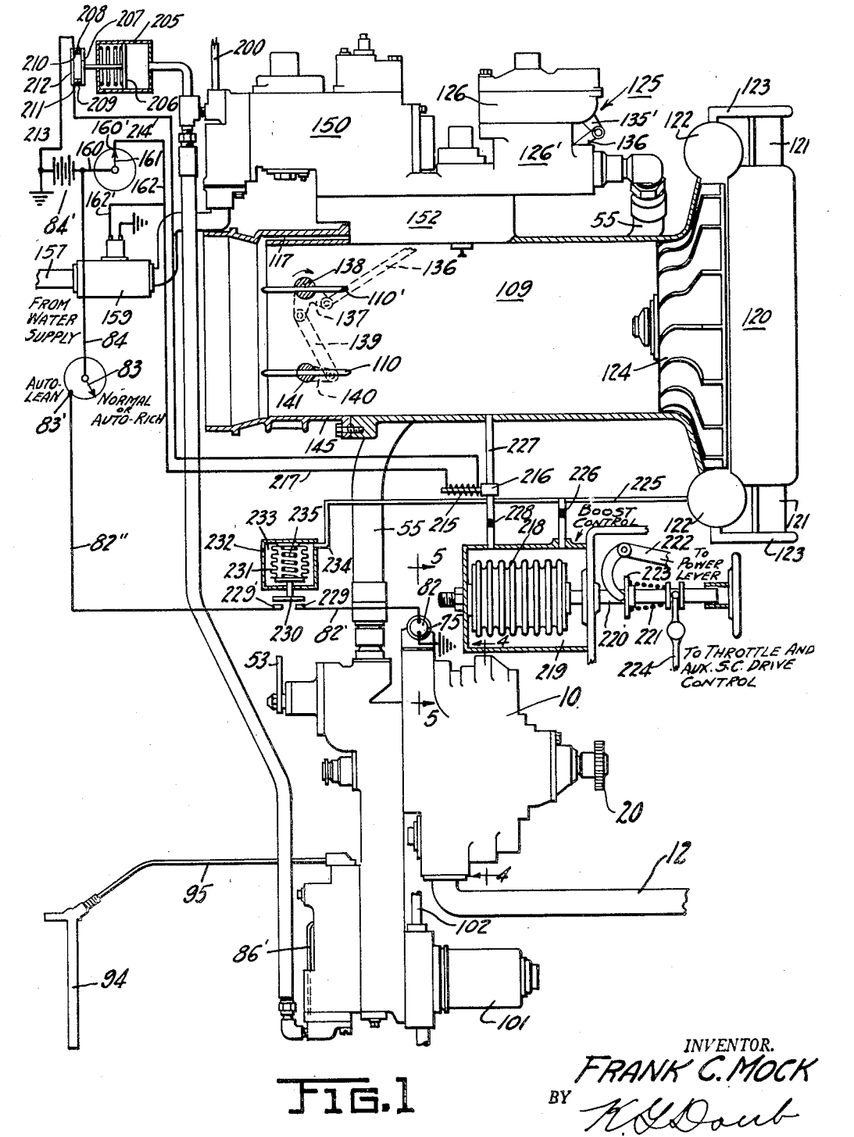
Figure 1 is a schematic view, principally in elevation, of a speed metering device or carburetor in accordance with the invention.

An engine is diagrammatically illustrated at 120, Figure 1; it is of the radial type and provided with a plurality of cylinders 121 to which air under supercharger pressure is directed by way of manifold 122 and manifold pipes 123; an engine driven or first stage supercharger being indicated at 124. While not shown in the schematic view of Figure 1, the system is adapted for use with a second or auxiliary stage supercharger located anterior to the throttles 110, 110'. The intake conduit 109 is shown connected to a throttle body 145 through which the passage 117 extends and opens out into the main air intake passage upstream of the throttles 110, 110'.

Accelerator pump

Figure 3:
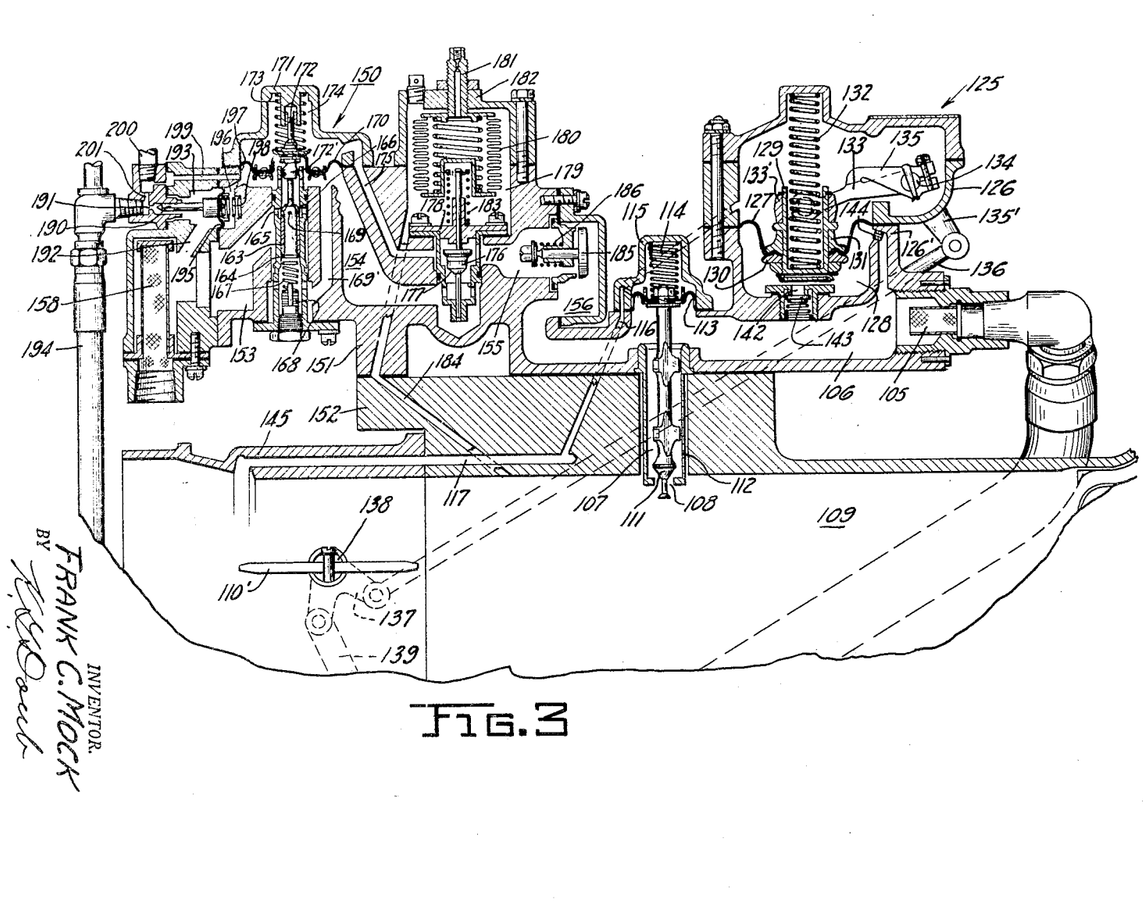
Figure 3 is an enlarged sectional view of the upper portion of Figure 1, showing the water metering unit and coacting controls.
Figure 4:
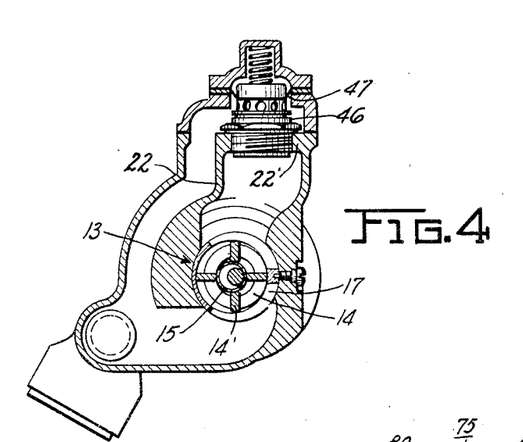
Figures 4 and 5 are sectional views taken on the lines 4—4 and 5—5, Figure 1.

An accelerator pump is generally indicated at 125; it comprises a pair of connected housings 126, 126' engaging the peripheral edge of a pump diaphragm 127, Figure 3, which overlies a fuel pressure chamber 128. A hollow plunger 129 is connected to the central portion of the diaphragm 127 by members 130 and 131. The lower end of a spring 132 is engaged in the socket or plunger 129 and its upper end in a socket formed in the pump cover or cap. An arm 133 is pivotally connected at one end to a member 133' which in turn is detachably connected to the upper end of the plunger 129, the opposite end of the said arm being journaled for free rotation on a shaft 134 mounted in the housing 126. A lever 135 has its free end arranged for one-way abutting engagement with the arm 133 and at its opposite end is pinned to the shaft 134, the latter being operatively connected to the throttles 110, 110' by means of an arm 135', link 136 and bell crank lever 137 which is secured on the outer end of throttle shaft 138 and pivotally connected to a link 139 in turn connected to an arm 140, Figure 1, secured to the outer end of throttle shaft 141. The bottom wall of the chamber 128 is provided with a discharge port 142, mounting a check valve 143, which permits one-way flow of fuel from the chamber 128 into the chamber 106. However, fuel may pass from the chamber 106 to the chamber 128 through a fill restriction 144. The throttles may be actuated, either manually or automatically, from a suitable control device or power quadrant, not shown. To insure unhindered action of the diaphragm 127, the space or chamber thereabove is vented to the passage 116.

The accelerator pump operates as follows:

In the position of the parts as shown in the drawings, the throttles 110, 110' are wide open, the lever 135 at this time abutting the lever 133 and with the assistance of the spring 132, holding the pump plunger 129 and diaphragm 127 in the position these parts assume after the pump has discharged. The strength of the spring 132 is such that it will hold the plunger and diaphragm "down" against the pressure of the fuel in the chamber 106 with a certain amount of assistance from the lever 135 (depending upon how fast it is desired to have the pump fill). When the throttles 110, 110' are rotated to closed position, the lever 135 is moved clear of the arm 133, whereupon fuel under pressure will force its way through the orifice 143 into the chamber 128 and load the pump, at the same time moving the diaphragm 127 and plunger 129 back against the resistance of the spring 132. Should the throttles be suddenly opened, very little manual effort will be required to discharge the pump, since the loaded spring 132 will provide a major portion of the force needed to move the diaphragm and piston downwardly or in a fuel-expelling direction, whereupon fuel will be discharged past the check valve 143 into the chamber 106 and temporarily augment the pressure of the fuel in the latter chamber for acceleration purposes. Thus, the acceleration pump is charged and discharged primarily by fuel pressure and the force of the loading spring 132 with but little effort by way of its mechanical connection with the throttle.

Antidetonant or water metering device

This device, in its broader aspects has certain features in common with that disclosed in Patent No. 2,509,648. Thus, it incorporates a poppet valve which flows water at a substantially constant head to a metering valve arranged to vary the area of a metering orifice as a function of an engine condition, and it also incorporates a derichment valve control valve which, should the water supply pressure drop below a predetermined value, will close and open the derichment valve. However, there may be certain conditions of operation under which the derichment control valve of the device of Patent No. 2,509,648 will not close promptly, which objection has been overcome in the water metering unit as herein disclosed. Other features of difference include means for obtaining simplification in structure and flexibility in installation and use. Such features of novelty as are present in the herein disclosed water metering device are claimed in the copending application of Jay A. Bolt and Robert W. Moore, Serial No. 749,716 filed May 22, 1947 and now Patent No. 2,447,793.

The antidetonant or water metering unit is generally indicated at 150; it is shown in elevation in Figure 1 and in schematic or sectional diagram in Figure 3. Referring to the sectional view, a main casting or housing 151 is anchored to a boss 152 formed on the section 109 of the intake conduit adjacent the throttle body 145. The casting 151 is formed with a water inlet chamber 153, an unmetered water chamber 154, a metered water chamber 155, and a discharge chamber 156. Water is taken from a suitable supply such as a water tank, not shown, and flows by way of a conduit 157, Figure 1, to and through a strainer 158 into the chamber 153. A pump 159 is mounted in conduit 157; it may be of conventional construction having an in-built by-pass rendered operative when a predetermined delivery pressure is encountered, and it may be operatively connected to a power control device as illustrated and described in the copending application of Stanley B. Smith and Frank C. Mock, Serial No. 533,296, filed April 29, 1944, and which latter application also embodies certain features in common with the water metering device as herein disclosed. The water pump is shown as being electrically driven from a suitable source of supply such as the battery 84', which connects with the pump motor by way of wire 160, switch 161, contact 160' and wires 162, 162', the switch 161 being under manual or automatic control as desired.

Controlling flow of fluid between chambers 153 and 154 is a pressure regulating valve 163, Figure 3, herein termed the poppet valve since it is of the poppet type, said valve being slidable in a valve housing or guide bushing 164 formed with a port or ports 165 and a valve seat 166. A spring 167 normally urges the valve 163 toward seated position, said spring being adjustable by means such as shims 168. The body of the valve 163 is hollow and at its upper end the valve wall is formed with a bleed 169, the latter permitting a restricted by-pass flow of water from chamber 153, thence through the hollow valve body and a passage 169' to chamber 154, so that when the valve is closed, the pressures in said chambers will become equalized under certain conditions and for a purpose to be described.

Overlying chamber 154 is a diaphragm 170; it has its peripheral edge clamped between a cap or cover 171 and the adjacent surface of the main casting 151, and its central portion is engaged between a pair of clamp members on a guide rod 172 whose upper end projects into a guide pocket or recess formed by the cap 171 and whose lower end carries a ball head 172' in contact with the stem of valve 163. A spring 173 encircles the guide rod 172 and normally urges the latter in a valve-opening direction, or downwardly as shown in Figure 3. The cap 171 defines a chamber 174 above the diaphragm 170 which is vented to metered water pressure by a passage 175.

A metering valve is indicated at 176; it controls the area of a metering orifice 177 through which water flows from chamber 154 to chamber 155. The valve 176 has a stem which projects through a guide member forming part of a bushing 178 which closes off chamber 155 from a bellows chamber 179 in which is mounted a pressure responsive spring loaded bellows 180. One end of the bellows 180 is anchored by means of a threaded stem 181 to a cap or cover 182, while the opposite or movable end thereof is provided with a cup-shaped member having an abutting connection with the stem of the valve 176, a light spring 183 encircling the valve stem and normally urging the said stem against said member. A passage 184 communicates interstage duct pressure to the bellows chamber 179, which pressure for engines having certain characteristics has proven satisfactory as a reference pressure for the water metering valve 176. However, this reference pressure may be taken from the intake manifold direct or from any other suitable point, as desired and found advisable for the particular engine to which the water metering system may be applied.

A check valve 185 prevents back flow of fuel into the water metering system from chamber 156; the pressure at which it will open being predetermined by adjustable spring 186.

A derichment valve control valve is indicated at 190; it controls a port 191 through which inlet water pressure may be communicated by way of passage 192, chamber 193 and conduit 194 to the chamber 74 of the valve 66 (compare Figure 3 with Figure 2). The valve 190 is connected to a diaphragm 195 which forms a movable wall between the chamber 193 and a chamber 196, the latter being in communication with the unmetered water chamber 154 by way of passage 197. A spring 198 is located in the chamber and normally urges the valve 191 toward seated position; it predetermines the differential pressure acting on the diaphragm 195 at which the valve 191 will open and closes the valve when the differential drops below a certain value. A vent passage 199 communicates chamber 154 as well as chamber 196 with a line 200 leading back to the water tank, not shown, to insure closing of the derichment control valve under certain conditions and to also vent the system of air before the water reaches the metering valve. A restriction or bleed 201 communicates conduit 194 with the line 200, to insure proper functioning of the valve 66.

It is generally desirable to have an arrangement whereby the manifold pressure will be automatically increased when water is injected, and automatically returned to normal should the system fail or run dry, or when the water supply pressure drops below a predetermined value. The particular or specific means by which this may be accomplished forms no part of the present invention. For example, a pressure switch, Figure 1, may be used, said switch comprising a cylinder 205 having mounted therein a piston 206 which carries a bar 207 of conducting material provided with contacts 208 and 209 adapted to engage companion contacts 210 and 211 carried by an insulated bar 212, the latter being inserted in an electric circuit including ground wires 213, 214 for the coil 215 of a solenoid valve 216, the coil 215 being placed in circuit with the contact 160' by means of wires 217 and 162.

A manifold pressure bellows 218 is mounted in a chamber 219 and forms part of a boost control which operates in general like that illustrated in the Smith and Mock application Serial No. 533,296, heretofore noted. The manifold pressure bellows constitutes part of a variable datum assembly including a datum rod 220 which is connected to the movable end of the bellows 218 and is encircled by datum spring 221, adjustable by means of a lever 222 engaging a slidable bushing or collar 223. The lever 222 is adapted to be controlled from a pilot's power control member or quadrant, not shown. The arm or lever indicated at 224 may control a servo valve for a servo system and coacting mechanism which operates to maintain power for a given datum setting by opening the throttles until engine stage supercharger capacity is attained and thereafter increasing the drive on the auxiliary stage system, not shown; it is movable both in response to manual adjustment of the datum spring 221 and in response to movement of the bellows 218 due to changes in manifold pressure. Thus, assuming the power control lever has been set for a given manifold pressure, should the pressure in the chamber 219 drop due, for example, to a gain in altitude, the bellows 218 will extend itself and thereby open the throttles 110, 110', and/or regulate the drive on the supercharging system to maintain such manifold pressure.

The manifold pressure chamber 219 is in communication with the intake manifold of the engine by way of a conduit 225 having a bleed 226 therein, and said chamber may also be placed in communication with a lower pressure source, such as the intake conduit 109, by way of a conduit 227 having a bleed 228 therein, the solenoid valve 216 controlling said latter conduit. When the solenoid valve 216 is open, the pressure in chamber 219 is lowered independently of the action of the lever 222, and hence the manifold pressure will be increased due to extension of the bellows 218, the manifold pressure resuming its normal value upon closing of the solenoid valve 216.

The manifold pressure switch 230 is controlled by a bellows 231 mounted in a housing 232, the latter defining a bellows chamber 233 which is in pressure communication with the engine intake manifold by means of a conduit 234. A spring 235, mounted in the bellows 231, normally urges the switch 230 to closed position. This manifold pressure switch is primarily a safety switch in that it insures against the use of an auto-lean fuel-air ratio when the manifold pressure is above a given value.

The antidetonant or water metering unit operates as follows:

The conduit 157 and chambers 153, 154, 155 and 156 may be considered a continuous flow passage terminating in the mixture chamber 106. Assuming the pilot of an airplane equipped with a system such as that herein disclosed desires to go into emergency power with accompanying water injection, he turns switch 161 to contact 160' and the water pump starts operating and builds up pressure in the chamber 153 and water flows across the poppet valve 163 (which is then open due to spring pressure) and into the chamber 154, where it acts on the diaphragm 170 in a direction tending to close the poppet valve. From chamber 154, the water flows through metering orifice 177 into chamber 155, and from the latter chamber pressure is communicated to chamber 174 on the opposite side of the diaphragm 170. Since metered water pressure is substantially equal to discharge nozzle pressure (neglecting the drop across the check valve 185) the valve 163 will maintain the pressure in chamber 154 at a substantially constant value above discharge nozzle pressure as determined by the force of spring 173; and this will produce a substantially constant drop across the metering valve 176 so that the metering of water will be in proportion to the effective area of the metering orifice 177. The position of the valve 176 which controls this orifice is governed by the bellows 180, which is vented to interstage duct pressure. For an engine of the type shown, interstage duct pressure constitutes a fairly accurate reference pressure for the desired water-to-fuel ratio.

The diaphragm 195 of the derichment control valve 190 is responsive to the drop or differential across the poppet valve 163 which differential tends to open the derichment control valve against the resistance of the spring 198. If adequate water supply pressure exists but for some reason no water is flowing across the metering valve to the discharge nozzle, or should the poppet valve become stuck, there will be no poppet valve drop, (this being assured even though the poppet valve 163 should be tightly closed by the small bleed 169 in parallel with the poppet valve 163, which will then equalize the pressures in chambers 153 and 154) and since there will then be no differential pressure across the diaphragm 195, the spring 198 will close the valve 190. In case the supply of water should become exhausted and the supply pressure drop, there will be a diminishing force acting on the derichment control valve diaphragm in a valve opening direction, whereupon the spring 198 will close the valve 191 when the supply pressure drops to a predetermined value. For example, should the water system run dry with the pump 159 still running, the latter might otherwise build up sufficient air pressure in the device to maintain the derichment control valve 190 open, a hazard which is overcome by the method of derichment valve control herein disclosed.

When the derichment control valve 190 opens, water pressure is communicated to the pressure switch 205, the solenoid valve 216 is opened thereby bleeding pressure from bellows chamber 219 and the manifold pressure is increased; and water pressure is also applied by way of conduit 194 to the chamber 74 of the derichment valve 66, and both of the diaphragms 68 and 70 move upwardly and close the derichment valve 66. Whenever the water supply runs out, or should the switch 161 be opened and the water pump stopped, valve 190 will close and pressure will be relieved from the chamber 74 by way of conduit 194 and vent conduit 209, while at the same time pressure will be relieved in back of the pressure switch piston 206, the circuit to the solenoid valve 216 broken and the latter will close, thereby returning the manifold pressure to its previous value. The carburetor will then meter on a normal or auto-rich fuel-air ratio.

*General description of operation*

The fuel pump 13 may be suitably geared to the engine or power plant to be supplied with fuel and driven thereby. As the rotor 14 rotates, fuel is drawn through the conduit 12 and into the chamber 11, from which it is forced by the rotor blades or vanes 14' into the governor chamber 21. The relief valve 46 is set to maintain the fuel in chamber 21 at a predetermined pressure over and above the pressure in the unmetered fuel chamber C, and when this pressure is exceeded, the valve 46 is opened and the excess fuel is by-passed back to the chamber 11. When the engine is operating, the rotating governor weights 34 and the idle spring 45 tend to open the poppet valve 29 and permit fuel under pressure to pass from the chamber 21 through the valve port 31 into the unmetered fuel chamber C, from which the fuel flows through the main metering orifice 60 into the metered fuel chamber B and thence through the fuel conduit 54 and metered fuel line 55 to the mixing chamber 106 and into the nozzle chamber 107. As soon as the metered fuel pressure attains a value equivalent to the pressure setting of the discharge nozzle 111, the latter opens and fuel is discharged into the engine intake conduit 109. The poppet valve 29 will float towards open or closed position until the governor head acting on diaphragm 40 balances the force of the governor weights 34. Since the governor rotates in direct relation to engine speed, the thrust of the governor weights is proportional to speed squared, and therefore a balancing differential across the diaphragm 40 is maintained proportional to speed squared and the metering head across the orifice 60 is also maintained proportional to speed squared for any given position of the metered needle 90. Assuming a fixed area of the metering orifice 60, then flow therethrough is proportional to the square root of the pressure difference thereacross and hence is proportional to engine speed. For a constant condition of manifold pressure and exhaust back pressure, the flow of air to the engine will vary in direct proportion to engine speed, and the control mechanism will correspondingly vary the quantity of the fuel supplied to the engine. Since the mass rate of air flow to the engine is dependent not only on the engine speed but also upon manifold or charging pressure, air temperature and exhaust back pressure, the area of orifice 60 is controlled by the manifold and exhaust back pressure needle 96, while the area of the temperature orifice 91 is controlled by the temperature responsive needle 90. Thus, as the manifold pressure is varied, as by actuation of the throttles 116, 110', or by variation in speed of the supercharger 124 and/or the auxiliary supercharger (not shown) at a given throttle opening, such variations will be transferred to the chamber in which the bellows 100 is mounted and will be imposed upon said bellows, the effective action of the bellows 100 being modified through the action of the bellows 103.

Were it not for the supplemental metering orifice 61 and associated controls including the contoured end portion of the needle 60 and the derichment valve 66, the fuel-air ratio as determined by the rate of metering through the orifice 60 would have to be initially sufficiently rich for an engine having given characteristics to insure smooth operation of the engine throughout the entire range of power output; and while an economical fuel-air ratio may be maintained as long as the engine is in prime condition, it may not be sufficiently rich to avoid engine failure should the efficiency of the latter become impaired, while at the same time it may be too rich for maximum economy when cruising under light loads. Also, when water injection is used at high manifold pressures, it is desirable to select a fuel-air ratio which is economically lean but which will still maintain the desired power output without detonation. In Figure 8, the curve 235 represents the fuel supplied through the main metering orifice 60 with the derichment valve closed, while the shaded portion up to the curve 236 represents the fuel supplied through both the main metering orifice 60 and the supplemental or auto-rich orifice 61 with the derichment valve open.

In the position of the parts in Figures 1 and 2, the switch 83 has been turned to normal or auto-rich position and the water pressure switch 161 to "on" position; the solenoid valve 76 is down closing the port 85 and venting the chamber 71 between the upper and lower diaphragms 68 and 70 to the vent line 57 by way of the passage 86', 88' and 87, while the derichment valve control valve 190 is open and water pressure has been communicated to the pressure switch 205, thereby raising the manifold pressure, and also to chamber 74 beneath the lower diaphragm 70, thereby closing the derichment valve 66. Metering now takes place through the main metering orifice 60 only while water is being metered in the manner heretofore described.

Assuming a condition where the pilot desires a relatively lean fuel-air ratio, as when cruising at light loads, he turns the switch 83 to the cruise or auto-lean position, whereupon the solenoid coil 79 is energized and the valve 76 is raised clear of the lower port 85, thereby communicating fuel under pressure to the chamber 71 between the upper and lower diaphragms 68 and 70 by way of passages 86 and 86', whereupon the valve 66 is closed as indicated in Figure 6. The carburetor will then be metering along the curve 235 of Figure 8. Should the manifold pressure for any reason rise above a value where the lean fuel-air ratio might cause detonation, the switch 230 will open, solenoid coil 79 will be de-energized, venting chamber 71 and derichment valve 66 will open.

Should the pilot be traveling at a speed and load which would justify a relatively rich mixture, (assuming the water switch to be off) he turns the switch 83 to "normal or auto-rich," the solenoid 79 is then de-energized and the valve 76 moved downwardly, closing the port 85, whereupon the chamber 71 between the upper and lower diaphragms 68 and 70 is vented to the vapor vent line 57 by way of the passages 86' and 87, and the derichment valve is opened, note the position of the parts in Figure 7. Metering now takes place not only through the main metering orifice 60 from chamber C, but also by way of passage 63 and 63' and chambetr 65 through the supplemental orifice 61, as indicated by the curve 236 of Figure 8.

While the carburetor and water metering device are shown interconnected in coacting relation, it will be obvious that the multiple position metering system of the carburetor will function equally well with or without the water metering system. Also, the water and fuel systems could operate with separate discharge nozles instead of by way of a common mixing chamber as shown. These and other modifications and rearrangement of parts will be obvious to those skilled in the art, and it should therefore be understood that the invention is not limited to the specific structure used for the purpose of illustration, but only by the appended claims.

I claim:

1. In combination with an engine having an intake manifold and a device for supplying a primary fuel to the engine, an auxiliary charge injection system for suppling an auxiliary charging fluid to the engine having metering means rendered operative at predetermined manifold pressures, said primary fuel device having primary and secondary metering orifices arranged in parallel, a flow passage for unmetered fuel provided with a port which when open permits fuel to flow to both primary and secondary orifices but which when closed permits fuel to flow to only the primary orifice or orifices, a derichment valve controlling flow of fuel through said port, and means for operating said derichment valve in timed relation with said auxiliary fluid metering means.

2. In combination with an engine having an intake manifold and a device for supplying a primary fuel to the engine, an auxiliary charge injection system for supplying an auxiliary charging fluid to the engine including a flow passage having metering means therein rendered effective at predetermined manifold pressure, said primary fuel device having a primary fuel metering orifice and a secondary metering orifice and a needle provided with a contoured metering portion for each orifice and movable to vary the effective area of said orifices, a fuel by-pass passage provided with a port which when open permits unmetered fuel to flow to and through both of said orifices but which when closed permits fuel to flow to and through only the primary metering orifice, a derichment valve coacting with said port, and means for operating said derichment valve in timed relation with said auxiliary fluid metering means.

3. A fuel feeding device for an internal combustion engine having a water injection system applied thereto, comprising an unmetered fuel chamber, a metered fuel chamber, a pair of coaxial orifices arranged for parallel flow of fuel from the unmetered fuel chamber to the metered fuel chamber, a movable double contour valve arranged for the simultaneous control of the effective areas of said orifices, a derichment valve for controlling the flow of fuel to only one of said orifices, and means for closing the last-named valve when water is being supplied to the engine.

4. In a fuel feeding system for an engine having a throttle, a fuel conduit having metering means therein including a plurality of metering orifices arranged in parallel flow relationship, a metering needle for varying the effective areas of said orifices, means adapted to automatically position said needle as a function of an engine condition, separate flow passages adapted to receive fuel upstream of said orifices and direct it through said orifices to the engine, a derichment valve for causing unmetered fuel to flow through either one or a plurality of said passages, and means for selectively operating said valve irrespective of throttle position.

5. In a fuel feeding system for an engine, a fuel conduit having metering means therein including a plurality of metering orifices arranged in parallel flow relationship, a metering needle for varying the areas of said orifices, means adapted to automatically position said needle as a function of an engine condition, separate flow passages adapted to receive fuel upstream of said orifices and direct it through said orifices to the engine, a derichment valve for causing unmetered fuel to flow through either one or a plurality of said passages, means for selectively operating said valve, said valve operating means including a fluid pressure chamber operatively associated with said valve, and means for selectively controlling the admission of fluid under pressure to said chamber.

6. In a fuel feeding system for an engine having a throttle, a fuel conduit, metering means in said conduit including a main metering orifice and a supplemental or auxiliary metering orifice arranged in parallel flow relationship, a metering needle adapted to simultaneously control the effective areas of said orifices, means for automatically adjusting the position of said needle as a function of an engine condition, a passage for unmetered fuel arranged to by-pass the main metering orifice and conduct fuel to the auxiliary metering orifice, a derichment valve for controlling said by-pass, and means for selectively operating said valve irrespective of throttle position.

7. In a fuel feeding system for an engine, a fuel conduit, metering means in said conduit including a main metering orifice and a supplemental or auxiliary metering orifice arranged for parallel flow of fuel therethrough, a metering needle adapted to simultaneously control the effective areas of said orifices, means for automatically adjusting the position of said needle as a function of an engine condition, a passage for unmetered fuel arranged to by-pass the main metering orifice and conduct fuel to the auxiliary metering orifice, a valve for controlling said by-pass, and hydraulic means for selectively operating said valve.

8. In a fuel metering system for an engine, a fuel conduit for flowing fuel to the engine, metering means in said conduit including a main metering orifice and a supplemental or auxiliary metering orifice arranged in substantially coaxial relationship for parallel flow of fuel therethrough, a double contoured metering needle for simultaneously controlling the effective areas of said orifices, means for automatically positioning said needle as a function of an engine condition, a passage for by-passing unmetered fuel around said main metering orifice and conducting it to the auxiliary metering orifice, a valve for controlling said passage, and means for selectively operating said valve.

9. In a fuel feeding system for an engine having a throttle, a fuel conduit for flowing fuel to an engine, metering means in said conduit, a main metering orifice and an auxiliary metering orifice arranged in parallel flow relationship, means for maintaining a metering head across said orifices as a function of engine speed, a metering needle contoured to simultaneously control the effective areas of said orifices, means for automatically positioning said needle as a function of the flow of air to the engine, a passage arranged to by-pass unmetered fuel around said main metering orifice and conduct it to said auxiliary metering orifice, a valve controlling said passage, and means for selectively operating said valve.

10. In a fuel feeding system for an engine, a throttle controlled air intake conduit, a fuel supply conduit terminating in a discharge nozzle adapted to open when subjected to a predetermined fuel pressure, a chamber for metered fuel in flow communication with said nozzle, an accelerator pump provided with a fuel storage chamber in free one-way discharge communication with said metered fuel chamber and in restricted inflow communication with said latter chamber, a reciprocating pumping element, a spring arranged to normally urge said element in a fuel discharging direction, said spring being of such strength as to permit fuel under pressure flowing into said storage chamber to retract said pumping element and charge the pump, and means mechanically connecting said spring pressed pumping element with the throttle.

11. In a fuel feeding system for an engine, a throttle controlled air intake conduit, a fuel supply conduit terminating in a discharge nozzle adapted to open when subjected to a predetermined fuel pressure, a chamber for metered fuel in flow communication with said nozzle, an accelerator pump provided with a fuel storage chamber and a wall separating said storage chamber from said metered fuel chamber, said wall being provided with a discharge port and a check valve permitting one-way discharge of fuel from the storage chamber through said port into the metered fuel chamber, said wall being also provided with a restricted orifice permitting restricted inflow of metered fuel to the storage chamber, a reciprocating pumping element for pumping the fuel from the storage chamber into the metered fuel chamber, a spring arranged to normally urge said element in a fuel discharging direction, said spring being of such strength as to permit fuel under pressure flowing into said storage chamber through said restricted orifice to retract said pumping element and charge the pump, and means mechanically connecting said spring pressed pumping element with the throttle.

12. A fuel feeding system as claimed in claim 11 wherein said mechanical throttle connection is arranged to positively urge said pumping element to its discharge position when the air intake throttle is initially moved from a closed to an open position but moves clear of said pumping element when the throttles are moved from an open to a closed position.

FRANK C. MOCK.

REFERENCES CITED

The following references are of record in the file of this patent:

UNITED STATES PATENTS

| Number | Name | Date |
|---|---|---|
| 2,362,145 | Mallory | Nov. 7, 1944 |
| 2,392,565 | Anderson | Jan. 8, 1946 |
| 2,397,984 | Schorn | Apr. 9, 1946 |
| 2,431,590 | Smith | Nov. 25, 1947 |